(12) United States Patent
Devlic et al.

(10) Patent No.: US 9,124,489 B2
(45) Date of Patent: Sep. 1, 2015

(54) METHOD, APPARATUS AND SYSTEM FOR SETTING A SIZE OF AN EVENT CORRELATION TIME WINDOW

(71) Applicant: TELEFONAKTIEBOLAGET L M ERICSSON (PUBL), Stockholm (SE)

(72) Inventors: Alisa Devlic, Stockholm (SE); Catalin Meirosu, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 286 days.

(21) Appl. No.: 13/768,771

(22) Filed: Feb. 15, 2013

(65) Prior Publication Data

US 2013/0215939 A1  Aug. 22, 2013

Related U.S. Application Data

(60) Provisional application No. 61/602,174, filed on Feb. 23, 2012.

(30) Foreign Application Priority Data

Feb. 20, 2012 (EP) .................................... 12156156

(51) Int. Cl.
    *H04L 12/24* (2006.01)
    *H04L 12/26* (2006.01)
    *H04Q 3/00* (2006.01)

(52) U.S. Cl.
    CPC .......... *H04L 41/0631* (2013.01); *H04L 41/064* (2013.01); *H04L 43/0817* (2013.01); *H04L 43/0852* (2013.01); *H04L 43/10* (2013.01); *H04Q 3/0075* (2013.01); *H04Q 2213/13349* (2013.01)

(58) Field of Classification Search
None
See application file for complete search history.

(56) References Cited

U.S. PATENT DOCUMENTS 7,661,032 B2    2/2010  Eberbach et al.
7,889,666 B1 *  2/2011  Pei et al. ............ 370/242

OTHER PUBLICATIONS

Natu, et al. Using Temporal Correlation for Fault Localization in Dynamically Changing Networks. Int. J. Netw. Manag. 18, 4 (Aug. 2008), 301-314.
Griffith, et al. Dynamic Adaptation of Temporal Event Correlation for QoS Management in Distributed Systems. Short paper in 14th IEEE International Workshop on Quality of Service. Jun. 2006.
Wu, et al. Finding a needle in a haystack: pinpointing significant BGP routing changes in an IP network. In Proceedings of the 2nd conference on Symposium on Networked Systems Design \& Implementation—vol. 2 (NSDI'05), vol. 2. USENIX Association, Berkeley, CA, USA, 1-14.

* cited by examiner

*Primary Examiner* — Hoon J Chung (57) ABSTRACT

Transmitting and receiving arrangements and methods in a Digital Subscriber Line (DSL) system having a plurality of modems and vectored transmission capability. A first part of an available frequency band is reserved for vectored DSL transmission and reception using modems operating in the first part of the frequency band. The remaining, second, part of the available frequency band is reserved for both vectored and non-vectored transmission using modems operating in the second part of the frequency band.

12 Claims, 5 Drawing Sheets

| Node | Interval length (ms) | | |
|---|---|---|---|
| | n | n - 1 | n - 2 |
| Node 110a | 100 | 100 | 100 |
| Node 110b | 50 | 80 | 110 |
| Node 110c | 30 | 30 | 30 |
| Node 110d | 40 | 150 | 75 |
| Node 110e | 75 | 75 | 75 |

METHOD, APPARATUS AND SYSTEM FOR SETTING A SIZE OF AN EVENT CORRELATION TIME WINDOW

RELATED APPLICATIONS

This application is a continuation of co-pending U.S. patent application Ser. No. 12/376,292 filed Feb. 4, 2009, now U.S. Pat. No. 8,369,391, which is a 371 of International Application No. PCT/EP2007/055869, filed Jun. 14, 2007, the disclosures of which are fully incorporated herein by reference.

TECHNICAL FIELD

The present technology relates to alarm and event correlation, and more particularly, to event correlation time windows.

BACKGROUND

Event and alarm correlation is a well known technique in network management. An event correlation algorithm may determine a series of clusters of events that are likely to be related to each other by combining methods that take into account several properties of the events—such as the time when the events originated, time when the events were received by a network management node (or management station or similar), location where the event or alarm was generated, topology information about the network, etc. From a network fault management perspective, the event correlation is an essential step towards determining a root cause defect that is responsible for events within such cluster.

An important feature in event correlation and root cause analysis is the correct size of an event correlation time window. An event correlation time window is a specified time period during which event information received from various places in a network is collected and stored in a memory of a network management node or similar. After an event correlation time window expires, events received during this time window are analyzed and used in determining a root cause for these events. Commonly the event correlation time window is set to a fixed size which is overlapped in continuous manner over the stream of events in order to select the events of potential interest. If the time window is large it may impose unnecessary requirements in terms of memory or processing power on the network management node performing the analysis. If the time window is small it may instead exclude events which would be of use during the root cause analysis.

A small degree of adaptability of the event correlation time window is introduced by Maitreya Natu and Adarshpal S. Sethi in "Using temporal correlation for fault localization in dynamically changing networks" Int. J. Netw. Manag. 18, 4 (August 2008), 301-314. Natu and Sethi suggest setting the size of the window to the time between two consecutive topology updates in case of frequent topology updates. In case of infrequent topology updates it can be set to some minimum time for a change to be reported to a manager.

In "Dynamic Adaptation of Temporal Event Correlation for QoS Management in Distributed Systems." (Short paper in 14th IEEE International Workshop on Quality of Service, June 2006), authored by Rean Griffith, Joseph L. Hellerstein, Gail Kaiser, and Yixin Diao, an approach that takes propagation delays into account is proposed. The proposal includes a system to measure actual delays, a component that estimates propagation delays in a statistical manner, and a controller that updates temporal rules associated to events based on the above-mentioned information. The method proposed can account only for fairly simple changes in the temporal patterns of the propagation. Further, the algorithm disclosed works well when propagation skews are independent and identically distributed. However, in metro or wide-area transport networks, it is likely that a problem resulting in re-routing would cause propagation delays that are strongly dependent on the topological location of the problem.

Wu, Mao, Rexford and Jian "Finding a needle in a haystack: pinpointing significant BGP routing changes in an IP network. In Proceedings of the 2nd conference on Symposium on Networked Systems Design \& Implementation—Volume 2 (NSDI'05), USENIX Association, Berkeley, Calif., USA, 1-14" propose a mechanism for determining a correlation window based on combining a fixed time interval with and a maximum number of events that have to occur during this interval. The time interval is set, as a constant, according to particular characteristics of the routing system. The maximum number of events is also set according to a heuristic method. The proposal described in relies on a heuristic estimation of the control parameters. As such, it is difficult to adapt the method to a particular network configuration without having expert knowledge on how the method works and how the overall network properties need to be reflected in the heuristic.

Other approaches to determining the size of the event correlation time window includes adapting the size in depending on the events and sequences of events received by a management node. E.g. U.S. Pat. No. 7,661,032 B2 describes a window-resizing module as part of their event correlation system. Their proposal is based on an algorithm that, given a current event it recognizes this event as part of a larger symptom, and thus anticipates a future event that might occur as part of the same symptom at a future time and automatically extends the size of the correlation window to take into account this future event. This approach requires large a-priori knowledge on the events and sequences of events that are part of a symptom.

All the above-mentioned methods for setting the size of an event correlation time window are thus associated with one or more disadvantages.

SUMMARY

The present disclosure relates to mechanisms for setting an event correlation time window size such that at least some of the above mentioned disadvantages are obviated or reduced.

In one embodiment, a method for setting a size of an event correlation time window in a network comprising a plurality of network nodes is provided. The method comprises the step of collecting, during one or more collection rounds, information regarding interval length between transmission of consecutive Operations, Administration, and Maintenance, OAM, packets sent from each network node. The method further comprises the step of setting the size of the event correlation time window using the collected interval length information. The size of the event correlation time window is set to be larger than a largest value of said interval length information collected during said one or more collection rounds.

In another embodiment, a network node for setting a size of an event correlation time window in a network comprising a plurality of network nodes is provided. The node comprises a network interface configured to collect, during one or more collection rounds, information regarding interval length between transmission of consecutive Operations, Administration, and Maintenance, OAM, packets sent from each network node. The node further comprises a data processing system configured to set a size of the event correlation time window using said interval length information, and to set the size of the event correlation time window to be larger than a largest value of said interval length information collected during said one or more collection rounds.

In yet another embodiment, a system comprising a plurality of network nodes, communicatively coupled to each other and to at least one network management node. The network management node is configured to collect, during one or more collection rounds, information regarding interval length between transmission of consecutive Operations, Administration, and Maintenance, OAM, packets sent from each network node. The network management node is further configured to set a size of the event correlation time window using said interval length information, and to set the size of the event correlation time window to be larger than a largest value of said interval length information collected during said one or more collection rounds.

An advantage with these embodiments is that the size of the event correlation time window can be dynamically adapted. Further, the size is adapted depending on the interval length between transmissions of subsequent OAM packets from a node in the network. Since the size is set to be larger than the largest interval length, it is very likely that all events originating from a symptom will be received during the event correlation time window while at the same time ensuring a fast update of the event correlation time window size.

BRIEF DESCRIPTION OF THE DRAWINGS

Reference will now be made, by way of example, to the accompanying drawings, in which.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
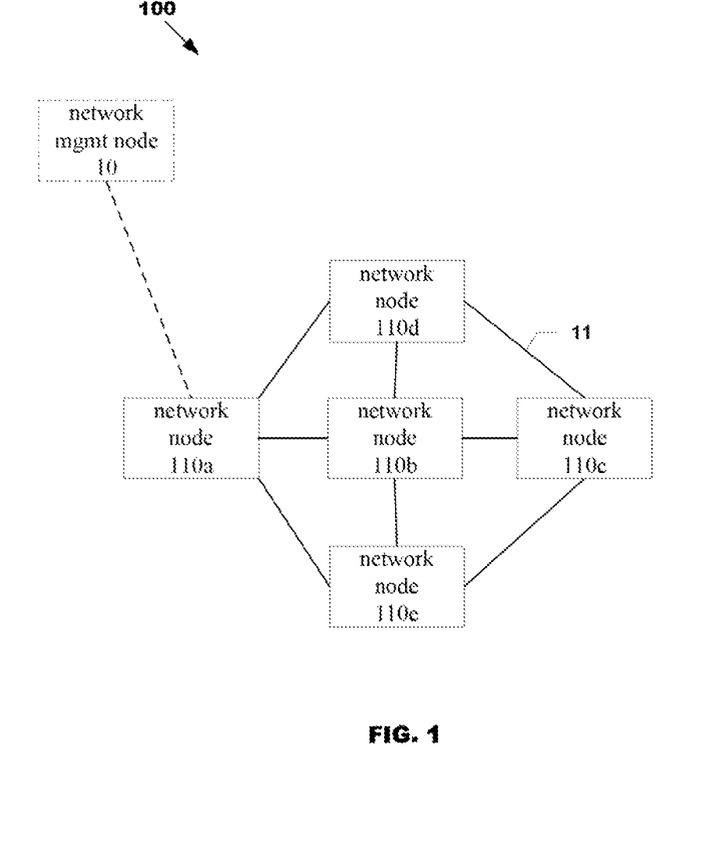
FIG. 1 is a diagram of an exemplary system in which embodiments of the present disclosure may be practiced.

FIG. 1 illustrates a network 100 in which embodiments of the present disclosure may be practiced. The network 100, which e.g. could be a metro or wide area network, includes a plurality of network nodes 110 connected via links 11 and a network management node 10. In some embodiments the network nodes 110 are routers forwarding and/or processing data packets received from other nodes in the network. Each network node 110 is configured to run a set of OAM tools and other performance measurement tools and to provide OAM data and performance measurements to the management node 10. The management node 10 is configured to process the data obtained from the network nodes 110. Even though the management node 10 is depicted separate from the other network nodes 110a-e its should be mentioned that any of the network nodes 110a-e may comprise the same functionality as the management node 10 and consequently perform all or parts of the methods described in the present disclosure.

Packets containing OAM data are periodically sent from the network nodes 110a-e to the management node 10 at defined intervals. The interval length may be node specific, i.e. different nodes may provide the OAM data to the management node at different intervals. The information in the OAM packets may be obtained by the node by so called proactive monitoring, see e.g. RFC6371: Operations, Administration, and Maintenance Framework for MPLS-Based Transport Networks.

Each network node 110a-e has a configured setting for sending OAM packets to the management node 10, the setting defining e.g. how often different OAM packets are to be sent to the management node. A node can provide different OAM data to the management node and the different OAM data can be provided at different transmission rates, depending on whether the OAM data is used for e.g. fault management, performance management or protection switching. OAM packets may e.g. be Continuity Check and Connectivity Verification (CC-V) OAM packets as defined in RFC6371 and/or associated with any of the OAM tools defined by IEEE 802.1ag, ITU-T Y.1731, or IETF MPLS-TP standards.

Figure 2:
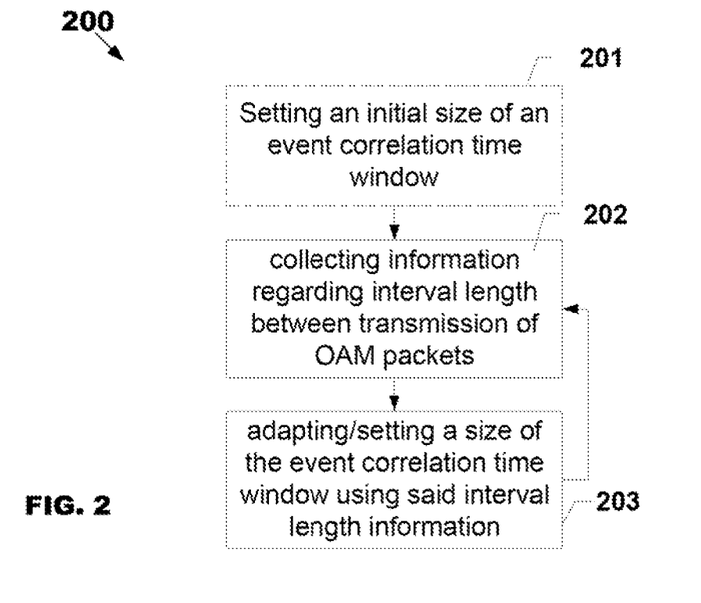
FIG. 2 is a flowchart of an exemplary method of setting the size of an event correlation time window according to an embodiment.

FIG. 2 is a flowchart of an exemplary method 200 of setting the size of an event correlation time window according to an embodiment of the present disclosure, and will be discussed in conjunction with FIG. 1. As previously mentioned each network node 110a-e has a configured setting for sending OAM packets to the management node 10. The network management node thus receives OAM packets from each network node 110a-e at certain rates. In step 201 an initial size of an event correlation time window is set. This initial size may be determined in various ways, which will be further described below.

In step 202 the interval length between consecutive transmissions of OAM packets from each network node is determined. These interval lengths may be determined by e.g. measuring the time between receipt of OAM packets from each node or by obtaining operator configured settings.

In step 203 (FIG. 2) the size of the event correlation time window is set using said interval length information. The interval length information may be used in different ways when setting the event correlation time window. According to a preferred embodiment the largest interval length information value received from said plurality of nodes is used in the window size determination. The event correlation time window size is then set to be larger than said largest interval length information value thereby making it probable that all events originating from a symptom will be received during the event correlation time window.

In the embodiment described with reference to FIG. 2, the time period between subsequent transmission of OAM packets may be denoted as $T_{OAM_i}$. A parameter denoted $T_{collect_i}$ is also defined representing the time period of data collection in the network. In the embodiment described with reference to FIG. 2 $T_{collect_i}$ is set equal to $T_{OAM_i}$.

A formula for calculating the correlation window size and setting the time interval will now be described. The parameter $T_{collect_{MAX}}$ represents the time period that is obtained as the maximum of the interval length information value between sending of consecutive OAM packets from the different nodes in the network during a particular collection round, i.e. $T_{collect_{MAX}} = \text{MAX}\{T_{collect_1}, T_{collect_2}, \ldots, T_{collect_i}, \ldots, T_{collect_n}\}$ (eq. 1), where $T_{collect_1}$ e.g. represents the time between sending of consecutive OAM packets from node 110a, and $T_{collect_2}$ e.g. represents the time between sending of consecutive OAM packets from node 110b, etc.

During each collection round, the system receives events during a time period equal to $T_{collect_{MAX}}$. After expiry of this time period the next collection round starts. Accordingly the length of consecutive collection rounds may vary.

Figure 3:
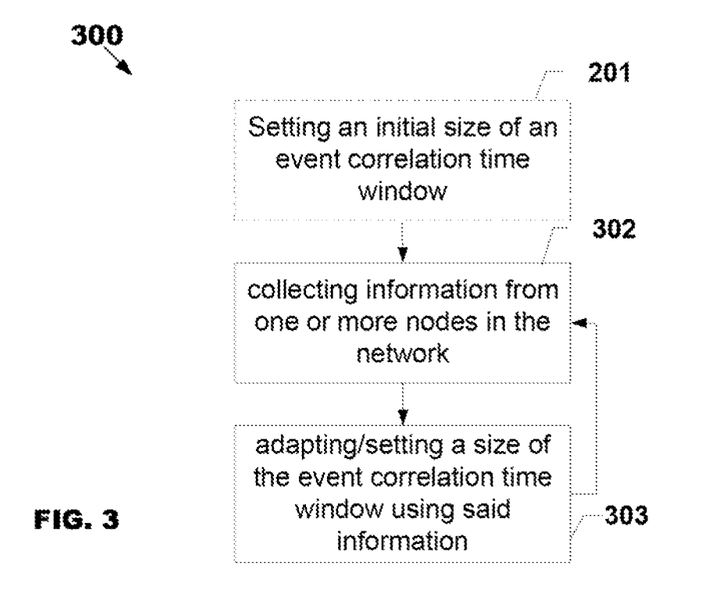
FIG. 3 is a flowchart of an exemplary method of setting the size of an event correlation time window according to another embodiment.
Figure 4:
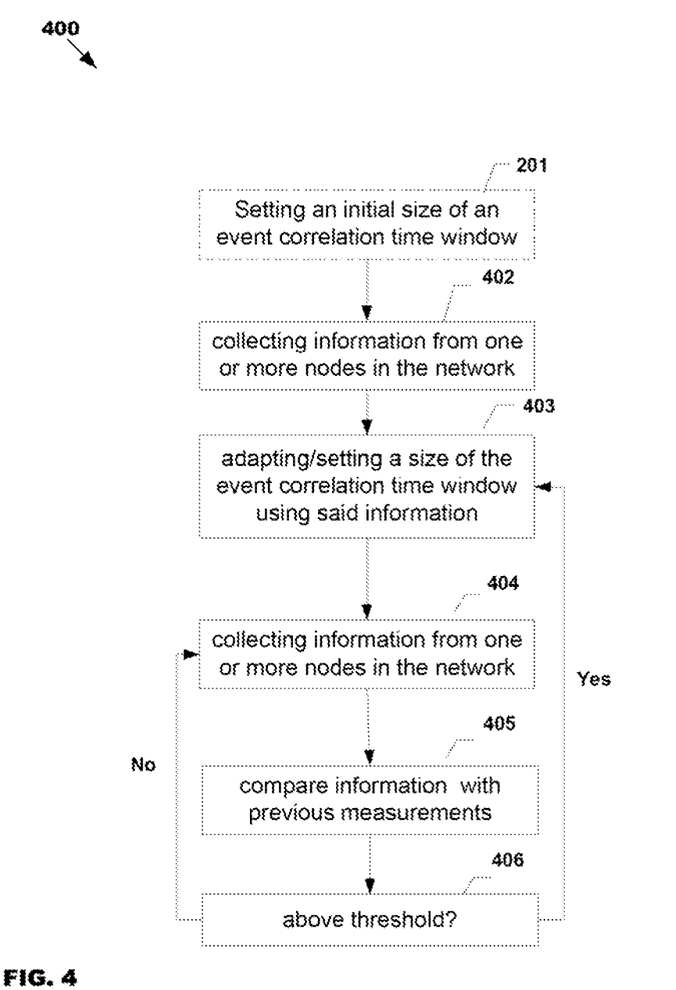
FIG. 4 is a flowchart of an exemplary method of setting the size of an event correlation time window according to yet another embodiment.
Figure 5:
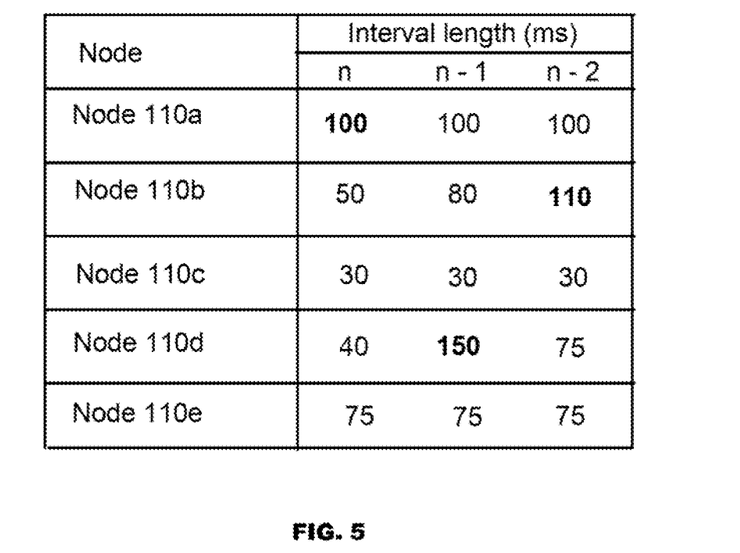
FIG. 5 is a block diagram schematically illustrating a table maintained in a network node, in accordance with certain embodiments.

FIG. 5 is a block diagram schematically illustrating a table maintained in a network management node according to an embodiment. The table contains interval length values collected from the nodes 110a-110e in the network during different collection rounds n, n−1, n−2. With reference to the FIG. 5 and equation 1, the value of $T_{collect_{MAX}}$ for collection round n, $$T_{collect_{MAX_n}},$$

would be 100 milliseconds (OAM interval for node 110a), $$T_{collect_{MAX_{n-1}}}$$

would be 150 milliseconds (node 110d) and $$T_{collect_{MAX_{n-2}}}$$

would be 110 milliseconds (node 110b). Note that in FIG. 5, only the values from a current correlation round, comprising three collection rounds, is illustrated. The table may of course contain data from further collection rounds as well as other information, such as the information collected in the embodiments described below with reference to FIGS. 3 and 4.

A first event correlation time window $CTW_0$ may be set (step 201) to an arbitrary size preconfigured by e.g. an operator. However, the first (initial) correlation window size may also be set to e.g. three times the maximum value collected during the first collection round in order to provision for potential delays that can be caused by any of the event correlation component activities, i.e. $CTW_0 = 3*T_{collect_{MAX}}$. This would be equal to $$300 \text{ ms}(3*T_{collect_{MAX_n}})$$

using the values from FIG. 5. Note that at any time new measurements can be added with their specific data collection periods, therefore $T_{collect_{MAX}}$ value is determined each time the data is collected. However, if in two subsequent data collection rounds (that are used for calculation of correlation time window size) the value of $T_{collect_{MAX}}$ changes, then the initial correlation time window size may be calculated as the sum of the $T_{collect_{MAX}}$ values in the first three data collection iterations:

$$CTW_0 = T_{collect_{MAX_0}} + T_{collect_{MAX_1}} + T_{colelct_{MAX_2}}.$$

This would be equal to 360 ms using the values from FIG. 5. The time interval of a first correlation round may then be set to: $\text{Time\_interval}_0 = [0, CTW_0]$ In a second correlation round (the method 200 moves on to step 202), the management node receives further OAM packets from the network nodes. Thus, the management node determines new values of $T_{collect_{MAX}}$ whereby the event correlation time window size is set (step 203) and may be defined as:

$$CTW_1 = \text{MIN}(K*T_{collect_{MAX_4}}, (T_{collect_{MAX_3}} + T_{collect_{MAX_4}})),$$

i.e. as the minimum value of: an integer (K) times the largest interval length value of the fourth collection round and the sum of the largest interval length values of the third and fourth collection rounds. Consequently, the time interval of the second correlation round is set to: $\text{Time\_interval}_1 = [CTW_0+1, CTW_1+CTW_0+1]$. The event correlation is performed periodically, typically after two collection rounds. The initial correlation window size may be set to an integer K (e.g. three) times the maximum data collection time period $T_{collect_{MAX}}$ in order to provision for potential delays that can be caused by any of the event correlation component activities.

The method thereafter continues by again performing step 202, now with updated values of interval length between receipt of OAM packets from fifth and sixth collection rounds. Note that step 202 is performed each correlation round and each correlation round comprise at least one collection round. Similarly, the time interval of a third correlation round can be represented as:

Time_interval$_2$=[CTW1+CTW0+2,CTW2+CTW1+ CTW0+2]

Finally, we can derive the time interval of the nth correlation round to be:

$$\text{Time\_interval}_n = \left[n + \sum_{i=1}^{n} CTW_{i-1}, n + \sum_{i=0}^{n} CTW_i\right],$$

where $n \in \mathbf{N}$

The values needed for calculation of the correlation time window size are in this embodiment obtained at the end of every second collection round (except the initial correlation time window size that is calculated after the first three collection rounds). Therefore, the correlation window size and the time interval are calculated every (2n+2) data collection rounds, where $n \in \mathbf{N}$.

The time window size may be thus set to a multiple, e.g. the number of collection rounds used in a correlation round, of said largest interval length information value received from the network nodes during these collection rounds, or as a sum of largest interval length information values from consecutive collection rounds.

According to an alternative embodiment the time window size is set equal to said largest interval length information value plus a preconfigured time value of a number of milliseconds, in order to provision for potential delays that can be caused by event correlation activities.

Referring now to FIG. 3 another embodiment of a method 300 of setting the size of an event correlation time window will be described. The method begins by setting (step 201) an initial time window size as described above with reference to FIG. 2.

The difference between the method 300 described with reference to FIG. 3 compared to the method 200 is that the method 300 does not only take the interval length between sending of consecutive OAM packets from various network nodes into consideration as in 200. The method 300 is adjusted to also take other parameters into consideration when determining the size of the event correlation time window. It should however be noted that it is not necessary to take all parameters described in the method 300 below into consideration. Excluding some of the parameters may be possible without resulting in an inferior method.

In step 302 the time consumed by plurality activities performed by the network nodes 110a-110e are measured and collected. These activities are $T_{collect_{MAX}}$, $T_{classify}$, $T_{correlate}$, $T_{graph}$ and used to calculate the event correlation time window size and set the time interval in which the events will be correlated. The formula for calculating the event correlation window size and setting the time interval is described below.

$T_{classify}$ is the time the taken for the management node to create events from obtained data if the measurement data have exceeded or fallen below a specific threshold or if the code message of the defect data matches the code specified in rules for creating the events. The management node may also apply timestamps to the created events to indicate the time when this data was received. The event creation results in an event stream which is used as an input for correlating the events during $T_{correlate}$ described below.

$T_{correlate}$ is the time to reorder events created during $T_{classify}$ from the event stream according to their occurrence time and correlates events (using a chosen event correlation technique). The output of the event correlation is a reduced number of events that have happened during a specific time interval on one or more network elements.

$T_{graph}$ is the time to create an event dependency graph, i.e. a hierarchical data structure representing events observed on different network elements during a specific time interval and dependencies between these events.

Note that $T_{collect_{MAX}}$ represents the time period of the data collection and is obtained as the maximum of the collection time periods of the provisioned OAM and performance measurement tools:

$$T_{collect_{MAX}} = MAX\{T_{collect_1}, T_{collect_2}, \ldots, T_{collect_i} \ldots , T_{collect_n}\}$$

To determine the collection time period of the particular measurement tool $T_{collect_i}$ this embodiments considers a plurality of the factors involved in the data collection, i.e., $T_{collect_i}$ can be represented as the sum of the following:
- the propagation time $T_{propagation_i}$ between the management node and each network nodes providing information to the management node
- the propagation time in the network, or the round trip time, $T_{RTT_i}$ as the time elapsed from sending a measurement request by a network node 110a-e representing a start measurement point (to an end measurement point router) until receiving the measurement result back at the start measurement point
- the time to obtain the measurements data $T_{read_i}$ i.e., the time taken by the management node to process the information received from the network nodes
- the time period between sending of consecutive OAM packets from the network node 110a-e, $T_{OAM_i}$.

$T_{collect_i}$ can thus be defined as:

$$T_{collect_i} = T_{propagation_i} + T_{RTT_i} + T_{read_i} + T_{OAM_i}$$

Additionally, if the method is performed by different nodes in the network, the propagation time between the different nodes and the nodes performing the method has to be added to each of the $T_{classify}$, $T_{correlate}$ and $T_{graph}$, i.e. if the event classification, event correlation, and creation of event dependency graph are performed at separate nodes in e.g. a cloud computing environment.

Still referring to FIG. 3, in a second correlation round (the method 300 moves on to step 302), the management node receives further information from the network nodes. Thus, the management node determines new values of $T_{collect_{MAX}}$ whereby the event correlation time window size is set (step 303) and may be defined as:

$$CTW_1 = MIN\bigl(K * T_{collect_{MAX_4}}, \bigl(T_{collect_{MAX_3}} + T_{collect_{MAX_4}}\bigr) + T_{classify_4} + T_{correlate_4} + T_{graph_4}\bigr)$$

Note that $T_{classify}$, $T_{correlate}$ and $T_{graph}$ will in most cases be 1-2 orders of magnitude lower than $T_{collect_{MAX}}$ (i.e., 100 ms vs. 1 sec or 1 minute), therefore in such cases $T_{classify}$, $T_{correlate}$ and $T_{graph}$ can be ignored in these calculations. An exception from this may occur if some of the functions performed by the management station are performed on different network nodes with different memory capacity, processing power, and propagation delays incurred during exchanging results among these network nodes.

If $$T_{collect_{MAX_3}} = T_{collect_{MAX_4}},$$

CTW1 is calculated as:

$$CTW_1 = MIN(K * T_{collect_{MAX4}}, 2 * T_{collect_{MAX4}} + T_{classify_4} + T_{correlate_4} + T_{graph_4})$$

The time interval of the second correlation round is thus set to: Time_interval$_1$=[CTW0+1, CTW1+CTW0+1]. Similarly, the time interval of the third correlation round can be represented as: Time_interval2=[CTW1+CTW0+2, CTW2+CTW1+CTW0+2]. Finally, we can derive the time interval of the nth correlation round to be:

$$\text{Time\_intervaln} = \left[n + \sum_{i=1}^{n} CTW_{i-1}, n + \sum_{i=0}^{n} CTW_i\right],$$

where n∈N

The values needed for calculation of the correlation time window size are in this embodiment obtained at the end of every second collection round (except the initial correlation time window size that is calculated after the first three collection rounds). Therefore, the correlation window size and the time interval are calculated every (2n+2) data collection rounds, where n∈N. The nth correlation time window size is calculated as:

$$CTW_n = MIN\bigl(K * T_{collect_{MAX_{2n+2}}},$$

-continued $$2 * T_{collect_{MAX_{2n+2}}} + T_{classify_{2n+2}} + T_{correlate_{2n+2}} + T_{graph_{2n+2}})$$

Or if the $T_{collect_{MAX}}$ values change during the two subsequent data collection rounds, $CTW_n$ is calculated as:

$$CTW_n = \text{MIN}(K * T_{collect_{MAX_{2n+2}}}, (T_{collect_{MAX_{2n+1}}} + T_{collect_{MAX_{2n+2}}}) + T_{classify_{2n+2}} + T_{correlate_{2n+2}} + T_{graph_{2n+2}})$$

It is assumed that the most of the correlation window time will be consumed by the data collection time $T_{collect_{MAX}}$. By also basing $T_{collect_{MAX}}$ on the propagation times in the network the event correlation time window size will be quickly adjusted in case of network topology changes. The new propagation times that are incurred will affect the window size which will in turn depend on the distance in the number of hops between these network nodes. However, in some cases, such as when parts of the method are performed by separate network nodes, $T_{classify}$, $T_{correlate}$ and $T_{graph}$ may have a large impact on the correlation time window value and therefore, they are added to the calculation of the adaptive correlation time window size.

FIG. 4 is a flowchart of an alternative method of setting the size of an event correlation time window according to yet another embodiment. The method begins by setting (step 201) an initial time window size as described above with reference to FIG. 2.

In step 402, information is collected from the network nodes 110a-110e during one or more collection rounds. The collected information could be various information as described with reference to step 302 in FIG. 3, but could also be merely interval length information between consecutive transmissions of OAM packets from each network node as in described with reference to FIG. 2.

In step 403, the size of the event correlation time window is adapted correspondingly as in steps 203 and 303 described with reference to FIGS. 2 and 3, respectively.

In step 404, information is again collected from the network nodes 110a-110e as in the same manner as in step 402.

In step 405 information received during the current collection round is compared to the information used when the size of the event correlation time window was set.

In step 406 it is determined whether the information received during a last collection round deviates from the information used when the size of the event correlation time window was set. If this deviation is above a set threshold the method moves on to step 403 according to alternative "Yes" whereby the size of the event correlation time window is adapted correspondingly using the new information. If, on the other hand, the deviation is below the set threshold, no adaptation of the event correlation time window size is performed, the previous size of the event correlation time window is used and the method returns to step 404 according to alternative "No".

The threshold may be set as a deviation from $T_{collect_{MAX}}$ used when setting the event correlation time window size, e.g.

$$\left| \frac{T_{collect_{MAX_n}} - T_{collect_{MAX}}}{T_{collect_{MAX}}} \right| \leq 0.10,$$

where $T_{collect_{MAX_n}}$ is the last received information values. Alternatively the threshold may be set as a deviation value of a fixed number of milliseconds instead of as a relative term.

An advantage of the embodiment described with reference to FIG. 4 is that the event correlation time window only needs to be updated in case a sufficient change (above the threshold) of the information values are detected. Thereby less computation capabilities may need to be used by the management node.

Figure 6:
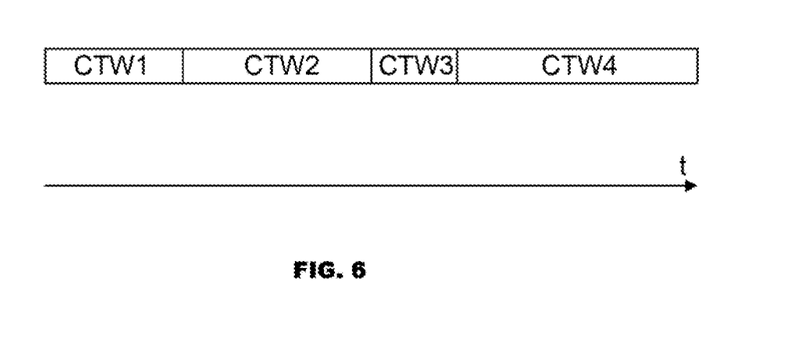
FIG. 6 is an illustration of how the size of an event correlation time window may vary over time.

FIG. 6 is an illustration of how the size of an event correlation time window may vary over time when implementing the methods described above with reference to FIGS. 2-4. Depending on the size of the values of $T_{collect_{MAX}}$ determined during each collection round, the size of the event correlation time window may be dynamically updated with a high rate corresponding to the time of a few collection rounds. This dynamic high rate update results in fast problem resolution times, due to reducing the false positives, i.e. events that are allocated to a wrong correlation window. Further, the described methods do not put a lot of requirements by the operating personnel compared to prior art methods since the update is performed automatically and only dependent on the collected information.

Figure 7:
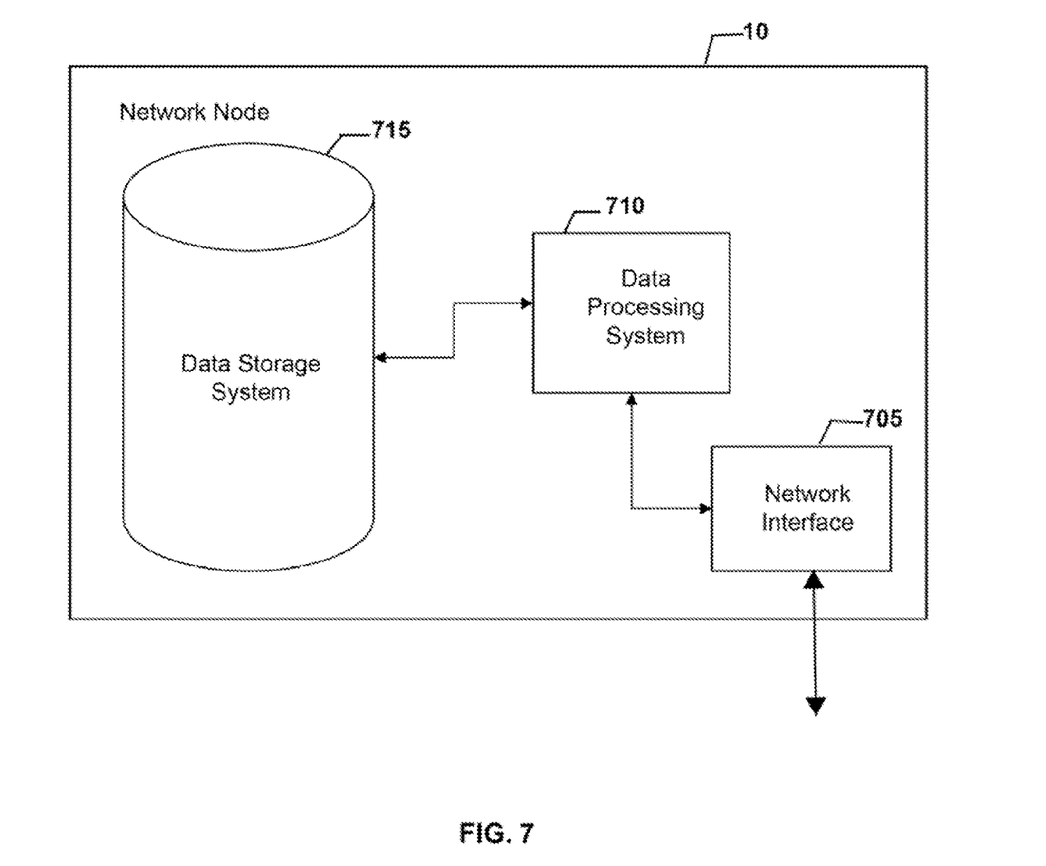
FIG. 7 is a block diagram of an exemplary network node according to certain embodiments.

FIG. 7 is a block diagram of a network management node 10 according to one embodiment of the present disclosure. The network management node 10 includes a network interface 705, a data processing system 710 and a data storage system 715. The network interface 705 generally includes analog and, in some embodiments, digital components for sending and receiving communications to and from other nodes, such as other network nodes 110 within the network 100.

According to the present disclosure the network interface 705 is configured to collect information regarding interval length between transmission of consecutive Operations, Administration, and Maintenance, OAM, packets sent from at least one network node in the network. The data processing system 710 is configured to set a size of the event correlation time window using the interval length information collected during one or more collection rounds. The size of the event correlation time window will be set larger than a value of the collected interval length information collected during the one or more collection rounds.

According to embodiments the network interface 705 is further configured to collect other information from the network nodes and the data processing system 710 is configured to set the size of the event correlation time window using said other information and the previously mentioned OAM interval length information. Example of such other information is propagation times $T_{RTT_i}$ (also called round trip time) between nodes in the network. Further examples of such other information include one or more of the following: execution times $T_{read_i}$ in the node; the time for classifying $T_{classify}$ events; the time for correlating $T_{correlate}$ events; the time to create an event dependency graph $T_{graph}$. The data processing system 710 is then accordingly configured to use said information in combination with said OAM interval length information, and possibly said round trip time, when setting the size of the event correlation time window.

According to an embodiment the data processing system 710 is configured to detect a change from a value of the collected information used when setting the size of the event correlation time window. The value of the collected information used when setting the size of the event correlation time window being stored in the data storage system 715. The data processing system 710 is further configured to compare the detected change with a set threshold value; and then set the size of the event correlation time window using said changed information if said change is larger than said threshold value.

According to a preferred embodiment the data processing system 710 is configured to set the size of the event correlation time window by using a largest collected information value received from the network nodes. E.g. the window size is set based on the largest OAM interval length information value received during each collection round. The largest value of each collection round that serve as basis for the calculation of the next window size is then used as basis for determining the size of the window, e.g. by summing these values. As an alternative the largest value of all collection rounds that serve as basis for the calculation of the next window size used as basis for determining the size of the window, e.g. by multiplying this value with the number of collection rounds.

According to an embodiment the data processing system 710 is configured to set the size of a next consecutive event correlation time window based on information collected during a current event correlation time window.

According to yet another embodiment the network interface 705 is further configured to collect propagation times $T_{propagation_i}$ between different network nodes performing parts of the method described in the present disclosure, whereby the data processing system 710 is further configured to set the size of the event correlation time window using the propagation times in combination with e.g. the OAM interval length information.

Those skilled in the art will appreciate that the block diagram of the network management node 10 necessarily omits numerous features that are not necessary to a complete understanding of this disclosure. Although all of the details of the data processing system 710 are not illustrated, the data processing system 710 comprises one or several general-purpose or special-purpose microprocessors or other microcontrollers programmed with suitable software programming instructions and/or firmware to carry out some or all of the functionality of the network node 110 described herein. In addition or alternatively, data processing system 710 may comprise various digital hardware blocks (e.g., one or more Application Specific Integrated Circuits (ASICs), one or more off-the-shelf digital and analog hardware components, or a combination thereof) configured to carry out some or all of the functionality of the network node described herein.

In some embodiments, computer readable program code is configured such that when executed by a processor, the code causes the data processing system 710 to perform steps described with reference to the flow charts shown in FIGS. 2-4. The network management node 10 also include a data storage system 715 for storing data necessary and/or suitable for implementing the functionality described herein, as well as for storing programming instructions which, when executed on the data processing system 710, may implement all or part of the functionality described herein. The data storage system 715 may e.g. include a table as shown in FIG. 5 for storing information received from different network nodes.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described embodiments that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims.

What is claimed is:

1. A method in a network management node of dynamically adapting a size of an event correlation time window (CTW) in a network having a plurality of managed network nodes, the method comprising the steps of:
   collecting, during one or more collection rounds by the network management node, information regarding interval length between transmission of consecutive Operations, Administration, and Maintenance (OAM) packets sent from each managed network node to the network management node; and
   setting the size of the event CTW by the network management node using the interval length information;
   wherein the event CTW specifies a time period during which the information collected by the network management node is stored in the network management node;
   wherein the size of the event CTW is set to be larger than a largest value of the interval length information collected during the one or more collection rounds, thereby ensuring events that would be of use during a root cause analysis are not excluded; and
   wherein the size of the event CTW is set smaller than a level at which the event CTW would impose unnecessary memory or processing power requirements on the network management node.

2. The method according to claim 1, further comprising the steps of:
   collecting by the network management node, information regarding propagation times between managed nodes in the network; and
   using by the network management node, the information regarding propagation times between managed nodes in the network when setting the size of the event CTW.

3. The method according to claim 1, further comprising the steps of:
   collecting by the network management node, information regarding execution times in the network management node; and
   using by the network management node, the information regarding execution times when setting the size of the event CTW.

4. The method according to claim 1, further comprising the steps of:
   collecting by the network management node, information regarding a time for classifying and correlating events in the network management node; and
   using by the network management node, the information regarding the time for classifying and correlating events when setting the size of the event CTW.

5. The method according to claim 1, further comprising the steps of:
   detecting by the network management node, a change from a value of the collected information used when setting the size of the event CTW;
   comparing the change to a threshold value; and
   setting the size of the event CTW by the network management node using the changed information if the change is larger than the threshold value.

6. The method according to claim 1, wherein the size of the event CTW is set as a multiple of the largest collected information value.

7. The method according to claim 1, wherein the information is collected by the network management node, in two or more consecutive collection rounds, and the size of the event CTW is set by the network management node, as a summation of the largest collected information values received during each of the two or more consecutive collection rounds.

8. The method according to claim 1, wherein the size of a next consecutive event CTW is set by the network management node based on information collected during a current event CTW.

9. A method in first and second network management nodes of dynamically adapting a size of an event correlation time window (CTW) in a network having a plurality of managed network nodes, the method comprising the steps of:
    collecting, during one or more collection rounds by the first network management node, information regarding interval length between transmission of consecutive Operations, Administration, and Maintenance (OAM) packets sent from each managed network node to the first network management node;
    collecting propagation times between the first and second network management nodes performing the method; and
    setting the size of the event CTW by the second network management node using the interval length information and the propagation times between the first and second network management nodes;
    wherein the event CTW specifies a time period during which the information collected by the first network management node is stored in the first and second network management nodes;
    wherein the size of the event CTW is set to be larger than a largest value of the interval length information collected during the one or more collection rounds, thereby ensuring events that would be of use during a root cause analysis are not excluded; and
    wherein the size of the event CTW is set smaller than a level at which the event CTW would impose unnecessary memory or processing power requirements on the first or second network management nodes.

10. A network management node for dynamically adapting a size of an event correlation time window (CTW) in a network having a plurality of managed network nodes, the network management node comprising:
    a network interface configured to collect, during one or more collection rounds, information regarding interval length between transmission of consecutive Operations, Administration, and Maintenance (OAM) packets sent from each managed network node to the network management node; and
    a data processing system configured to set a size of the event CTW using the interval length information;
    wherein the event CTW specifies a time period during which the information collected by the network management node is stored in the network management node;
    wherein the size of the event CTW is set to be larger than a largest value of the interval length information collected during the one or more collection rounds, thereby ensuring events that would be of use during a root cause analysis are not excluded; and
    wherein the size of the event CTW is set smaller than a level at which the event CTW would impose unnecessary memory or processing power requirements on the network management node.

11. The network node according to claim 10, wherein the network interface is further configured to collect information regarding propagation times between the plurality of managed network nodes, and wherein the data processing system is further configured to set the size of the event CTW using the information regarding propagation times.

12. The network node according to claim 11, wherein the processing system is further configured to set the size of the event CTW using one or more of the following:
    execution times in the network management node;
    a time required for the network management node to classify events;
    a time required for the network management node to correlate events; and
    a time required for the network management node to create an event dependency graph.

* * * * *